United States Patent [19]
Makuuchi et al.

[11] Patent Number: 5,977,203
[45] Date of Patent: Nov. 2, 1999

[54] PROCESS FOR PRODUCING CROSSLINKED POLYCAPROLACTONE

[75] Inventors: Keizo Makuuchi; Fumio Yoshii; Shin Hasegawa; Hiroshi Mitomo; Darmawan Darwis, all of Gunma-ken, Japan

[73] Assignee: Japan Atomic Energy Research Institute, Tokyo, Japan

[21] Appl. No.: 09/028,854

[22] Filed: Feb. 24, 1998

[51] Int. Cl.⁶ .................................................. C08J 3/28
[52] U.S. Cl. ................................................................ 523/30
[58] Field of Search ............................................. 523/300

[56] References Cited

U.S. PATENT DOCUMENTS 5,889,140  3/1999  Watanabe ................................. 528/354

OTHER PUBLICATIONS

M. Narkis, S. Sibony–Chaouat, A. Siegmann, S. Shkolnik and J. P. Bell. Irradiation effects on polycaprolactone, Polymer, Jan., 1985, vol. 26.

*Primary Examiner*—Edward J. Cain
*Attorney, Agent, or Firm*—Banner & Witcoff, Ltd.

[57] ABSTRACT

Polycaprolactone (PCL) is melted at a temperature of 60° C. or higher and subsequently cooled down to a non-crystallizing temperature and exposed to radiation so that it is crosslinked and a network structure is introduced to impart heat resistance to the PCL. Because of the high degrees of its crosslinking, heat resistance and transparency, the PCL product can be used as a heat-resistant tape or a heat-shrinkable film.

3 Claims, No Drawings

PROCESS FOR PRODUCING CROSSLINKED POLYCAPROLACTONE

BACKGROUND OF THE INVENTION

Polycaprolactone (PCL) is a polymer capable of microbiological degradation and various applications have been proposed for PCL as an environment friendly polymer. However, the relatively low melting point (60° C.) of PCL has limited its applicability to a wider scope of fields. According to the present invention, PCL is melted at 60° C. or higher and then cooled down to a non-crystallizing temperature, at which it is exposed to a radiation to introduce a network structure through crosslinking, thereby imparting heat resistance to the PCL. The irradiated PCL has the potential to be used as a tape or a heat shrinkable film.

Radiations used for engineering purposes include gamma-rays from cobalt 60 and electron beams from an accelerator. Having great penetrating power, gamma-rays are mainly used to sterilize medical devices which are final goods packed in corrugated board boxes. The penetrating power of electron beams is not as great as that of gamma-rays but they have the advantage of allowing for continuous application within a short time. Hence, electron beams are extensively used in modifying high-molecular weight materials through crosslinking, graft polymerization or decomposition reaction. The use of electron accelerators is more active than any other types of accelerators since by exposure to accelerated electron beams, a crosslinked structure can be easily introduced into high-molecular weight materials so as to achieve a marked improvement in their heat resistance. In the field of electrical wire coatings made from polyethylene and polyvinyl chloride, electron accelerators have been used for quite many years in order to improve their heat resistance through crosslinking. Several of such high-molecular weight materials require high doses radiation to be crosslinked and, hence, a technique has been proposed that allows for the crosslinking reaction to take place at lower doses through the addition of reactive monomers and the like.

However, not all of the reactive monomer used is consumed in the crosslinking reaction and it remains unreacted in a small amount; hence, the technique is held to be unsuitable for application to materials that are to be used in contact with food.

High-molecular weight materials are composed of either a crystalline region or a non-crystalline region. Since crosslinking due to irradiation mainly occurs in the non-crystalline region, some polymers such as polyethylene will readily crosslink if they are heated to temperatures higher than the melting point and exposed to radiation in an amorphous state. In polytetrafluoroethylene (Teflon), a crosslinking reaction does not occur at room temperature but a decomposing reaction will predominate; according to a recent finding, a crosslinking reaction occurs preferentially in polytetrafluoroethylene in a certain temperature range exceeding its melting point.

In order to crosslink PCL by irradiation at temperatures near room temperature, a dose as high as 200 kGy is required and yet a maximum gel fraction (a measure of the degree of crosslinking) that can be achieved is about 25%. Hence, no adequate improvement in the heat resistance of PCL cannot be accomplished at temperatures near room temperature. On the other hand, crosslinking is more likely to occur in PCL at temperatures near its melting point; however, the crosslinked product formed after the irradiation contains so many voids that a film compression molded from it has only low strength.

Under the circumstances, the present inventors conducted intensive studies and found that when PCL melted at 60° C. was cooled down to a non-crystallizing temperature and then exposed to radiations at that temperature, a product of an extremely high gel fraction was obtained at a lower dose than required by irradiation at temperatures near room temperature or the melting point of PCL; it was also found that the product could be compression molded with a hot press into a film having heat resistance and a high degree of transparency.

SUMMARY OF THE INVENTION

It is therefore an object of the invention to provide a process by which PCL having an increased degree of crosslinking can be easily produced through irradiation.

As already mentioned, if PCL is exposed to radiations at temperatures near room temperature, high doses are required and yet only low degree of crosslinking is attained; on the other hand, if PCL is irradiated at temperatures near its melting point, too many voids occur in the PCL to provide adequate heat resistance. With a view to solving these problems, the present inventors conducted intensive studies and found that when PCL melted at 60° C. was cooled down to a non-crystallizing temperature and then exposed to radiations at that temperature, a product of high degree of crosslinking could be obtained at lower doses and subsequently compression molded into a film having heat resistance and a high degree of transparency. The present invention has been accomplished on the basis of these findings and provides a process for producing PCL having high degrees of heat resistance and transparency which comprises melting PCL at its melting temperature or higher, cooling it down to a non-crystallizing temperature and exposing it to radiation at that temperature.

DETAILED DESCRIPTION OF THE INVENTION

The PCL to be used in the invention is a crystalline, thermoplastic aliphatic polyester resin having a number average molecular weight of $1 \times 10^4 - 1 \times 10^6$ and a melting point 60° C. It is also characterized by being biodegradable. The higher the molecular weight of PCL, the more efficient the process of its crosslinking upon irradiation; hence, the PCL to be used in the invention has preferably a number average molecular weight of $1 \times 10^5 - 5 \times 10^5$.

Commercial grades of PCL have heat stabilizers (antioxidants) and various other additives incorporated therein; in the present invention, there are no particular limitations on the molecular weight of PCL or the kinds of additives to be incorporated in it and any kinds of PCL may be applied. Depending on the use of the irradiated product, blends of PCL and other high-molecular weight materials may be employed in the invention.

Speaking of the dose of irradiation, the intended crosslinking reaction will start at a dose of 30 kGy and the degree of crosslinking increases with dose. For imparting heat resistance to PCL, irradiation at doses of about 100 kGy will suffice. There is no particular limitation on the dose of irradiation but for the purpose of increasing the production efficiency, higher doses of irradiation are preferred. There also is no particular limitation on the atmosphere of exposure to radiations but the required dose of irradiation decreases with decreasing oxygen concentration.

The irradiation temperature is the most important point of the invention, which is characterized in that PCL is first melted at its melting point (60° C.) or a higher temperature, then cooled down to non-crystallizing temperature of 35–50° C. and thereafter irradiated at that temperature. The preferred irradiation temperature is 45° C. Molten PCL starts to crystallize at 30° C. and, hence, irradiation at temperatures of 30° C. and below is not preferred. The temperature at which PCL is melted before irradiation is not particularly limited; however, once it is melted, PCL is preferably immediately cooled down to the irradiation temperature in order to prevent its decomposition.

Useful sources of radiation include α-rays, β-rays, γ-rays, X-rays, electron beams and ultraviolet rays. It is practical to use γ-rays from cobalt 60, as well as electron beams and X-rays.

To perform the process of the invention, a powder or pellets of PCL are placed in a test tube, melted in an oven at 80° C. and irradiated with gamma-rays in a metal block heated at 35–50° C. The resulting crosslinked PCL is sliced into thicknesses of 2–3 mm and compression molded at 200° C. to form films which have been found to have extremely high levels of heat resistance and transparency.

Alternatively, preshaped PCL films may be melted at 60° C. or above and irradiated at 35–50° C. and this method has the advantage of producing heat-resistant films without compression molding of irradiated PCL. The films produced in either way may be drawn at 60° C. and above, then cooled to produce transparent and heat shrinkable films.

Having the features described above, the heat resistant PCL produced by the process of the invention has the potential to be used as a heat-shrinkable or heat-resistant film. Since PCL is a biodegradable polymer, the product of the invention finds potential utility as difficult-to-recycle protective films on PVC containers or in agricultural fields. In addition, the product of the invention is improved in tension in a molten state due to crosslinking and, hence, it also has potential utility as a biodegradable foam.

EXAMPLE 1

Ten grams of PCL pellects ("BLAKCEL H7" of DAICEL CHEMICAL INDUSTRIES, LTD.; number average molecular weight, $1.28 \times 10^5$) were placed in a glass ampule (1.5 cm$^\Phi$), which was connected to a vacuum line, deprived of air and thereafter fused to seal. The thus prepared sample was melted completely in an oven at 80° C., inserted into a metal block preadjusted to 45° C., and irradiated with 100 kGy of gamma-rays from cobalt 60 at a dose rate of 10 kGy/h. After the irradiation, the glass ampule was cut open and a cylinder of PCL (1.5 cm$^\Phi$) was recovered. The cylinder was cut into a thickness of about 5 mm, wrapped with a stainless steel gauze of 200 mesh and boiled in chloroform for 48 h. The insoluble content (gel fraction indicative of the degree of crosslinking) was determined by the following equation:

$$\text{Gel fraction}(\%) = (W_2/W_1) \times 100$$

where $W_1$ is the dry weight of PCL before boiling and $W_2$ is the dry weight of PCL after boiling.

The same sample of PCL was sliced into thicknesses of 2–3 mm and compression molded into films by means of a hot press at 200° C. The films had a very high degree of transparency. The heat resistance of the films was evaluated with a high-temperature tensile tester at a drawing speed of 100 mm/min. The results are shown in Table 1. Lower haze values indicate higher degrees of transparency.

COMPARATIVE EXAMPLE 1

The same PCL sample as prepared in Example 1 was shaped under a hot press and cooled with a tap-water cooled press to form PCL films 0.1 mm thick. The films were irradiated with gamma-rays to a total dose of 100 kGy and evaluated for the gel fraction and heat resistance. The results are shown in Table 1. In the absence of gel formation, the films melted at 60° C. and above (they were not heat resistant at all).

EXAMPLE 2

The procedure of Example 1 was repeated, except that the total dose of irradiation with gamma-rays was 150 kGy. The resulting crosslinked PCL had a very high level of transparency with a haze value of 10%. The results of gel fraction measurement and heat resistance evaluation are shown in Table 1.

COMPARATIVE EXAMPLE 2

The procedure of Example 1 was repeated, except that the irradiation with gamma-rays was performed at 80° C., which was the same as the temperature at which the PCL sample was melted. The resulting cylinder of crosslinked PCL contained so many voids that the films produced by subsequent compression molding retained the voids and did not have any heat resistance. The results of gel fraction measurement and heat resistance evaluation are shown in Table 1.

TABLE 1

Gel Fraction and Heat Resistance at 120° C.

| Run No. | Dose, kGy | Gel fraction, % | Strength, MPa | Elongation, % | Haze, % |
|---|---|---|---|---|---|
| Example 1 | 100 | 70 | 2 | 550 | 15 |
| Comparative Example 1 | 0 | 0 | 0 | 0 | 100 |
| Example 2 | 150 | 82 | 3 | 470 | 10 |
| Comparative Example 2 | 150 | 60 | 0 | 0 | 15 |

The PCL produced by the process of the invention is crosslinked to a high degree and features high levels of heat resistance and transparency. The crosslinked PCL produced by the process of the invention is solely composed of PCL and contains no impurities that will compromise its safety and sanitary feature.

What is clamed is:

1. A process for producing a crosslinked polycaprolactone which comprises the steps of melting polycaprolactone at its melting point or a higher temperature, cooling down the melt to a non-crystallizing temperature and exposing it to radiation at that temperature.

2. The process according to claim 1, wherein the polycaprolactone is a synthetic polycaprolactone.

3. The process according to claim 1, wherein the irradiated polycaprolactone is shaped into a highly heat-resistant film.

* * * * *